(12) United States Patent
Lassen et al.

(10) Patent No.: US 6,820,830 B1
(45) Date of Patent: Nov. 23, 2004

(54) SHREDDER RESIDUE DISPERSION SYSTEM

(75) Inventors: David Lassen, Arnold, MD (US); Samuel Scott Sinnett, New Market, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 213 days.

(21) Appl. No.: 10/248,151

(22) Filed: Dec. 20, 2002

(51) Int. Cl.⁷ ............................................... B02C 23/10
(52) U.S. Cl. ..................... 241/186.3; 241/100; 414/299
(58) Field of Search ........................... 241/24.1, 24, 29, 241/30, 100, 186.2, 186.3; 232/44; 414/293, 299

(56) References Cited

U.S. PATENT DOCUMENTS

| | | | | |
|---|---|---|---|---|
| 3,682,402 A | * | 8/1972 | Goldhammer | 241/100 |
| 4,923,126 A | * | 5/1990 | Lodovico et al. | 241/30 |
| 6,126,375 A | * | 10/2000 | O'Brien | 414/299 |

* cited by examiner

Primary Examiner—Lowell A. Larson
(74) Attorney, Agent, or Firm—Stephen M. Bloor

(57) ABSTRACT

A security paper shredder where the residue of individual shredded document pages are collected in multiple collection bins for disposal, ensuring that no single collection bin contains the residue of any entire page. To further ensure that no adversary could obtain the contents of all the multiple collection bins and reassemble the document, the contents of the collection bins are disposed of at differing times and in geographically dispersed locations.

8 Claims, 1 Drawing Sheet

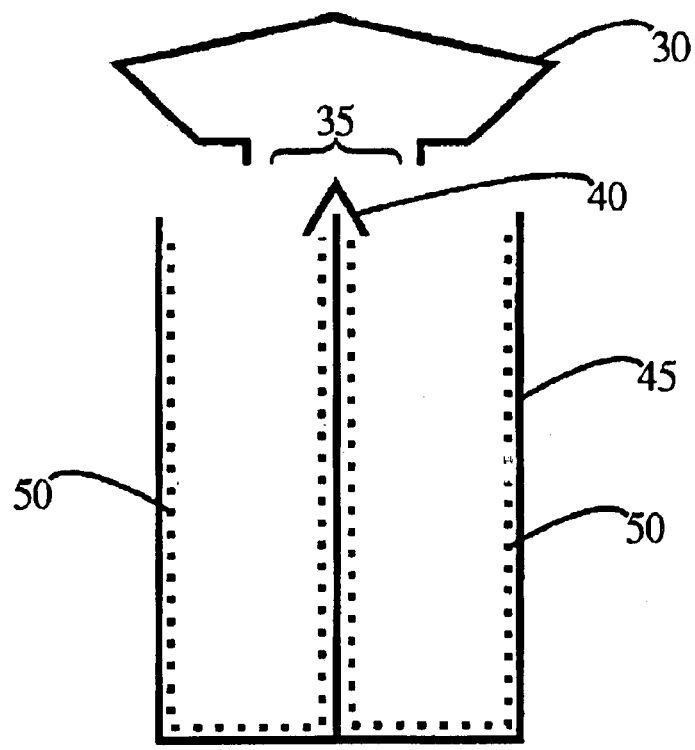
FIG. 1
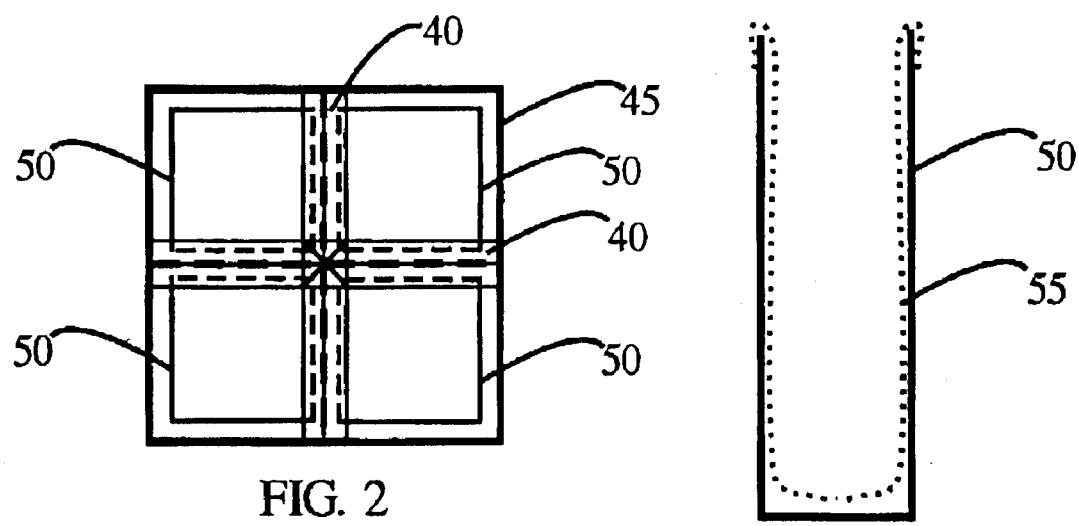
FIG. 2
FIG. 3

SHREDDER RESIDUE DISPERSION SYSTEM

BACKGROUND OF INVENTION

1. Field of the Invention

This invention relates generally to solid material comminution or disintegration, and more particularly to a paper shredder with separation or classification of material into a plurality of partitions or end walls.

2. Description of the Related Art

Paper shredders are used to protect the confidential information that would otherwise potentially be lost when papers containing such information are disposed of through conventional residential or business refuge removal. One of the easiest methods of conducting business or personal espionage is called "trash trawling," "dumpster diving," "waste archeology," or simply "trashing." All refer to rifling through curbside garbage, set out for refuge pickup, in an effort to cull valuable information on a business or person from their trash.

Paper shredding devices have been used for years to prevent the compromise of the information contained in personal and business papers (See for example U.S. Pat. No. 929,960, "Waste-Paper Receptacle," 3 Aug. 1909). Most paper destruction devices in use today operate using paired rotary cutting elements and fall into one of three categories: strip cutter, the most basic type of shredder, where the paper is cut into strips; cross cutters, where the paper is cut both in-line with the direction of insertion into the shredder and across that dimension; and disintegrators, which have sets of rotating cutting elements that simply randomly cut the paper until the shredded pieces are small enough to be able to fall through a screen below the cutting elements.

The efficacy of a paper shredder in preventing the reassembly, and hence compromise, of the shredded document is, among other things, dependent on the size of the shredder residue, with smaller average residue size being more secure and larger residue size being less secure. This is akin to the difficulty of a jigsaw puzzle being partially dependent on the size of the puzzle pieces. Unfortunately, given all of the pieces and enough time and effort, any puzzle or document can be reassembled.

The greatest weakness of paper shredders is that all of the pieces of all of the shredded documents are available in the effluence of the shredder. In normal residential or business operation the effluence of the paper shredder is collected in a refuge receptacle of some kind, usually a trash bag, and this trash bag is disposed of, through conventional disposal means only when it fills. A dumpster diving adversary then has access to the complete wholes of all the shredded documents—in fact in selecting documents for shredding the user may have pre-sorted the most sensitive documents for the adversary.

It might appear that an adversary's biggest difficulty would be sorting the residue into those portions which belongs to each piece of paper shredded but the operation of paper shredders makes this sorting much less difficult than is initially apparent. Paper shredders are by and large serial devices. They accept only a few sheets of paper, at most, for simultaneous shredding, with the higher security shredders accepting the fewest simultaneous sheets. After passing through the shredder mechanism, the shredded pages fall, or are otherwise transported, into the refuge receptacle and form a stratum in a stratified stack of individual document residue in the receptacle. The individual strata of documents written on paper of varying types or colors are easily discernable in the stratified stack. This discernable stratification makes the separation of the refuge receptacle residue into that residue attributable to individual document pages a much easier task for an adversary.

Further, some of the practical operating considerations of modern shredders make this even easier. High security shredders use multiple very high speed cutting elements to shred office paper rapidly into many thousands of pieces. This rapid cutting produces a great deal of paper dust and often leaves the paper residue with an electrostatic charge which causes the residue to stick to the shredder mechanisms instead of exiting the shredder as an effluence. See U.S. Pat. No. 4,893,759, Paper Shredder With Charge Removing Means," which is hereby incorporated in its entirety. The cutting heads of these cutting elements rapidly dull and the motive elements behind them rapidly wear if not properly lubricated and flushed to remove dust from the moving parts.

To combat the dulling of the cutting elements and to lubricate and clean the motive elements of the shredder these parts are usually well lubricated with oil. Many modern shredders even include systems for automatically oiling these parts (See for example U.S. Pat. No. 5,186,398, "Paper Shredder"). As a result of this lubrication, the shredder effluence is often also coated with oil. This causes the residue to stick together and hence helps ensure that the individual document stratums of residue are not mixed in the stratified stack of residue.

Some shredders are equipped with a wetting system to help suppress the paper dust generated and to cause a denser packing of the effluence. See, for example, U.S. Pat. application 20020017577, "Mobile Paper Shredder System." The wetting of the effluence, much like the oil coating, causes the residue to stick together and hence also suppresses mixing of individual document stratums in the stratified residue stack.

Stratification of shredder residue, the infusion of liquids into the residue, and the shredding of papers of differing types and colors all make reassembly of shredded documents easier but, as noted above, given access to all of the shredder residue of a document, that document can be reconstructed with enough effort.

It has been suggested that the addition of a mechanical auger, deployed in the refuge receptacle, or in the instant invention in each of the refuge receptacles, to stir the residue thereby destroying the stratification of the residue would add significantly to the security of the shredder. Unfortunately, the added complication and need to remove the auger mechanism before disposal of the material in the refuge receptacle have weighed against this improvement.

SUMMARY OF INVENTION

An object of the present invention is to provide a shredder residue dispersion system where shredder residue from each document shredded is directed into multiple residue receptacles for separation of the document residue to thwart reassembly.

In order to attain the objectives described above, according to an aspect of the present invention, there is provided a shredder residue dispersion system whereby the effluence of a paper shredder is directed into multiple residue receptacles which may then be disposed of in a manner to designed to make acquisition of all of residue of any one particular document more difficult than had the effluence not be separated.

The shredder residue dispersion system increases the security of a standard shredder by dispersing the shredded paper into multiple bins on a continuous basis. This ensures that no one document will be complete in any one residue bag. This can be coupled with a procedure of disposing of only one residue bag at a time on a rotating basis, of geographic dispersion in the disposal of the bags, or of combination of diverse time and location dispersion, to ensure that no adversary could collect the entire shredded document at any one time or in any one place.

The instant invention uses a deflector plate and multiple bins lined with bags to disperse and collect shredder residue. The material is usually gravity fed from the bottom of the cutting elements to the deflector plate. The plate ensures that the residue material does not back up into the cutting elements and ensures that the material enters the multiple collection bins. The deflector plate overlaps the bins so that no shredder residue will fall between the collections bins. The multiple bins fit underneath the deflector plate and are lined with residue collection bags.

The aforementioned features, objects, and advantages of this method over the prior art will become apparent to those skilled in the art from the following detailed description and accompanying drawings.

BRIEF DESCRIPTION OF DRAWINGS

My invention can best be understood when reading the following specification with reference to the accompanying drawings, which are incorporated in and form a part of the specification, illustrate alternate embodiments of the present invention, and together with the description, serve to explain the principles of the invention. In the drawings:

FIG. 1 is a side view one embodiment of the shredder residue dispersion system;

FIG. 2 is a top view of the shredder residue dispersion system showing the deflector plates and the open end of the multiple residue receptacles; and FIG. 3 is a side view of a residue receptacle showing a residue bag in place.

DETAILED DESCRIPTION

In the preferred embodiment of the present invention, shown in FIG. 1, paper residue exits the paper shredder 30 at its residue output orifice 35 and through the force of gravity falls onto a deflector plate 40 which quasi-randomly directs the falling individual pieces of paper residue into one of several residue collection bins 50. In the exemplar shown, a residue collector bin holder 45 holds four residue collection bins 50 and has a deflector plate 40 arranged to quasi-randomly direct the falling individual pieces of shredded paper in the residue stream from the paper shredder 30 into one of the four residue collector bins 50. The deflector plate 40 is centered under the output orifice 35 in most embodiments and is oriented axially so as to achieve the quasi-random direction of the paper residue. This orientation is dependent upon the correlation between the orientation of the paper input into the paper shredder 30 aid orientation of the resulting paper residue at the residue output orifice 35. For most modern paper shredders 30 best results would be achieved for the exemplar shown by centering the deflector plate 40 directly under the cutting elements of the paper shredder 30 and orienting one of the elements of the deflector plate 40 along the axial direction of the paper shredder 30 cutting elements.

Although in the preferred embodiment paper residue is directed from the residue output orifice 35 to the several residue collection bins 50 only through the force of gravity, in other embodiments this direction can be assisted by mechanical or vacuum distribution systems.

As shown in FIGS. 1 and 2, the deflector plate 40 presents an acute angle to the falling individual pieces of paper residue so as to divide the paper residue stream into residue collections bins 50 and to ensure that paper residue does not backup into the paper shredder 30. The deflector plate 40 extends over the proximal lip of the open end of the collection bins 50 to ensure that all paper residue falls into one of the collection bins 50 and not between them into the collector bin holder 45.

In the exemplar shown the collector bin holder 45 is shaped to hold four rectangular collection bins 50 and the deflector plate 40 simply has two crossed members to divide the paper shredder 30 residue flow into four portions. The present invention could be implemented with as few as two, or with any greater number of collection bins 50, as desired. Greater security is achieved with increasing numbers of collection bins 50 but at the expense of complexity of the design of the deflector plate 40 and collector bin holder 45 and shape of the collection bins 50. In embodiments with more than four collection bins 50 the deflector plate 40 may be star-shaped with the collection bins 50 designed to fit under the area between the points of the star.

To reduce the handling required and to make disposal of the shredder residue easier the residue collection bins 50 are lined with a residue collection bag 55 in the preferred embodiment, as shown in FIG. 3. These residue collection bags 55 can be removed from the residue collection bins 50 when full, or otherwise when desired, for disposal and replaced with a new collection bag 55.

Although there will be some increase in security simply by ensuring that the residue from any single shredded document is dispersed amongst multiple residue collection bags 55, much greater increases in security are achieved through the use of procedures that disperse the disposal of the residue collection bags 55. A preferred method of disposal dispersion is to dispose of only one residue collection bag 55 at a time, cycling through the multiple collection bags 55 on a disposal schedule, as they fill, or as otherwise desired. Because the collection bags 55 are left in use until full or until scheduled for disposal resulting in collection bags 55 of varying ages of use, this method has an additional advantage of causing the strata of paper shredder 30 residue to be misaligned between the multiple collection bags 55 making reassembly of shredded documents harder even if an adversary were able to collect all of the multiple time dispersed collection bags 55.

In another method of disposal dispersion the multiple collection bags 55 are disposed of in geographically dispersed locations. Even greater security from reassembly of the document can be achieved by combining the two disposal dispersion methods above. As the residue collection bags 55 are disposed of one at a time, cycling through the multiple collection bags 55 they are also disposed of in geographically disperse locations using this combined disposal dispersion method.

Although various preferred embodiments and methods of the present invention have been described herein in detail to provide for complete and clear disclosure, it will be appreciated by those skilled in the art, that variations may be made thereto without departing from the spirit of the invention or the scope of the appended claims

What is claimed is:

1. A shredder residue dispersion system for dividing a residue stream exiting a paper shredder's residue output orifice, comprising a plurality of residue collector bins arranged to receive said residue stream such that said residue stream is simultaneously received by all of said plurality of residue collector bins.

2. The shredder residue dispersion system of claim 1 further comprising a deflector plate interspersed between the paper shredder's residue output orifice and said plurality of residue collector bins such that said deflector plate directs said residue stream simultaneously into all of said plurality of residue collector bins.

3. The shredder residue dispersion system of claim 1 further comprising a plurality of collector bags wherein each of said plurality of residue collector bins is lined with one of said collector bags.

4. A method of shredder residue dispersion for dividing a residue stream exiting a paper shredder's residue output orifice, comprising the steps of:

directing the residue stream simultaneously into a plurality of residue collector bins arranged to receive said residue stream such that the portion of the residue stream received by any one of said plurality of residue collector bins forms the contents of that residue collector bin; and periodically disposing of the contents of at least one of said plurality of residue collector bins.

5. The method of shredder residue dispersion of claim 4 wherein the step of periodically disposing of the contents of at least one of said plurality of residue collector bins is performed on each one of said plurality of residue collector bins in turn.

6. The method of claim 5 wherein the disposing of the contents of each one of said plurality of residue collector bins in turn is accomplished on a disposal schedule.

7. The method of claim 5 wherein the disposing of the contents of each one of said plurality of residue collector bins in turn is accomplished when that one of said residue collector bins becomes full.

8. The method of shredder residue dispersion of claim 4 wherein the step of periodically disposing of the contents of at least one of said plurality of residue collector bins is performed such that the contents of each of said plurality of residue collector bins is disposed of in a location geographically diverse from the location of disposal of the contents of the others of said plurality of residue collector bins.

* * * * *